US006852259B2

(12) United States Patent
Michael

(10) Patent No.: US 6,852,259 B2
(45) Date of Patent: Feb. 8, 2005

(54) MOLDABLE PREFORM WITH B-STAGE THERMOSET POLYMER POWDER BINDER

(75) Inventor: Rajendran S. Michael, Milford, MI (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 346 days.

(21) Appl. No.: 10/246,283

(22) Filed: Sep. 18, 2002

(65) Prior Publication Data

US 2004/0051212 A1 Mar. 18, 2004

(51) Int. Cl.⁷ .............................. B29B 9/02; B29B 11/02
(52) U.S. Cl. ...................... 264/118; 264/109; 264/122; 264/123
(58) Field of Search ................................ 264/109, 118, 264/122, 123

(56) References Cited

U.S. PATENT DOCUMENTS

| | | | |
|---|---|---|---|
| 3,734,985 A | * 5/1973 | Greenberg ................. 264/45.3 |
| 4,054,713 A | 10/1977 | Sakaguchi et al. |
| 4,664,864 A | 5/1987 | Wersosky |
| 4,988,469 A | 1/1991 | Reavely et al. |
| 5,368,674 A | * 11/1994 | Ishii et al. ................ 156/272.2 |
| 5,369,192 A | 11/1994 | Ko et al. |
| 5,432,010 A | 7/1995 | Ko et al. |
| 5,480,603 A | 1/1996 | Lopez et al. |
| 5,665,185 A | 9/1997 | Meeker |
| 5,716,697 A | 2/1998 | Meeker |
| 5,759,927 A | 6/1998 | Meeker |
| 5,766,541 A | 6/1998 | Knutsson et al. |
| 5,833,304 A | 11/1998 | Daniel et al. |
| 5,837,181 A | 11/1998 | Leimbacher et al. |
| 5,874,033 A | 2/1999 | Meeker |
| 5,879,802 A | 3/1999 | Beard et al. |
| 5,884,962 A | 3/1999 | Mattingly et al. |
| 5,935,509 A | 8/1999 | Elliott |
| 6,030,575 A | 2/2000 | Barron et al. |
| 6,291,370 B1 | 9/2001 | North et al. |
| 6,319,444 B1 | 11/2001 | Kirk |
| 6,323,145 B1 | 11/2001 | Popper et al. |

FOREIGN PATENT DOCUMENTS

| EP | 0 088 584 B2 | 3/1983 |
| EP | 0 239 179 A2 | 3/1987 |
| EP | 0 491 204 B1 | 11/1991 |
| EP | 1 016 757 A1 | 11/1999 |

* cited by examiner

Primary Examiner—Stephen J. Lechert, Jr.
(74) Attorney, Agent, or Firm—Inger H. Eckert; Maria C. Gasaway

(57) ABSTRACT

A low cost, glass preform for use in making SRIM molded composite parts is formed by introducing a commercially available, b-stageable thermosetting powder binder either a preformed matting structure or to a continuous glass fiber strand that is subsequently chopped to form a matting structure. The b-stageable thermosetting powder binder will selectively migrate to the junction of two the glass fiber strands contained in the matting at elevated temperatures without crosslinking to adhere the two strands together, therein forming a preform having good retention characteristics. The preform may then be introduced to a mold and combined with a liquid thermosetting matrix resin to form a composite part.

8 Claims, 1 Drawing Sheet

MOLDABLE PREFORM WITH B-STAGE THERMOSET POLYMER POWDER BINDER

TECHNICAL FIELD

The present invention relates structural reinforced injection molding products and more specifically to a fiberglass preform having a B-stage thermoset polymer powder binder.

BACKGROUND OF THE INVENTION

There is an increasing need for high strength polymeric materials to replace metals in many applications. The polymeric materials have the advantage of lower weight and are often less expensive and more durable than metals. Usually, however, the polymeric materials are much lower in strength than the metal materials they replace. To improve the strength of these materials, polymeric materials are reinforced in some manner.

Thus, polymeric composite materials have been developed to meet these strength requirements. These composites are characterized by having a continuous polymer matrix in which is embedded a reinforcement material. This reinforcement material, in many cases, takes on the form of a relatively rigid, high aspect ratio material such as glass fibers.

To get the reinforcement material into the composite, the reinforcement material is usually placed into the mold in a first step, followed by closing the mold and then introducing a fluid molding resin. The resin fills the mold, including the interstices of the fibers, and hardens (by curing or cooling) to form the desired composite. Alternatively, temperature and pressure may be applied to the mold to cure the resin to form the desired composite.

It is highly desirable for the reinforcement material to be uniformly distributed throughout the composite article, thereby preventing weak spots within the composite material where reinforcement is lacking. To accomplish this, it is conventional for the reinforcement to be formed into a mat prior to introduction to the mold and then be introduced to the mold to be impregnated with resin to form the final composite article. The mat, or preform, is generally prepared by forming the reinforcing fibers into a shape matching the inside of the mold and applying a binder to the fibers. In some cases, a thermoset resin in pre-applied and then cured after the fibers are shaped into a mat. More typically, a thermoplastic binder is used, so that in subsequent operation the binder can be heated and softened and the mat subsequently shaped. This binder "glues" the individual fibers so that the resulting mat retains its shape when it is transferred to the mold for further processing.

The binders that are used primarily consist of three types. Predominately, binders having solvent-borne polymers, i.e. liquids, such as epoxy or polyester resings. The solvent-borne binders are applied in a spray or dip-coating application followed by a subsequent heating step to volatize the solvent and possibly cure the binders. These binders are undesirable from both an environmental perspective and because the process is energy intensive.

A second method utilizes heated thermoplastic materials which can be melted and sprayed as a binder. Use of these materials make a subsequent heating step unnecessary. However, in this method, "lofting", or inadequate compaction of the preform, typically occures, because the thermoplastics exhibit a lack of uniformity in their cooling patterns and extensive migration along fiber surfaces. This can lead to density gradients or lower density preforms than desired.

A third class of binders that may be used is powdered binders. Powder binders can be mixed with the fibers and then the mass formed into a preform shape, which is then heated to cure the binder in situ. The binders can also be sprayed to contact the fibers and then heated to melt the powder onto the fibers to form a preform. An advantage to this process is that the powder is effective in going to the junction, or crossover points, of the network of fibrous material. Thus, the powder adequately anchors the fibers together in the preform, but does not interfere with the subsequently applied binder resin along the majority of the fiber used to form the composite part.

Currently available powdered binders that are used in fiber preforms are expensive to manufacture. Also, certain powdered binders are not b-stageable thermosetting powders. A b-stageable thermosetting powdered binder, for the purposes of this invention, is defined as a powder binder which can be heated to a tackifying temperature without crosslinking such that it will stick to and adhere together the glass fiber stands in the system to form the fiber preform. It would thus highly desirable to provide a b-stageable powdered binder system that limits the cost.

SUMMARY OF THE INVENTION

The present invention provides a b-stageable powdered binder system for making moldable preforms that limits manufacturing costs that utilizes powdered binder systems currently used in the powder paint industry to bind together glass rovings or mats to form a fiber preform.

In one preferred embodiment, a premade matting product may be impregnated with the b-stageable thermosetting powder binder. The matting proceeds through oven at a raised temperature to tackify the powder binder to the matting, therein forming a preform. The preform may then be introduced to a mold, along with a matrix polymer resin, and molded to form a reinforced fiber composite part.

In another preferred embodiment, the preforms are made by first aspirating a b-stageable thermosetting powder binder onto a continuous filament fiber such as a conventional roving and chopping the coated fiber onto a belt. The chopped fiber proceeds through a lamination belt at a raised temperature to tackify the powder binder to the chopped fiber, therein forming a preform. The preform may then be introduced to a mold, along with a matrix polymer resin, and molded to form a reinforced fiber composite part.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

DETAILED DESCRIPTION AND PREFERRED EMBODIMENTS OF THE INVENTION

Figure 1:
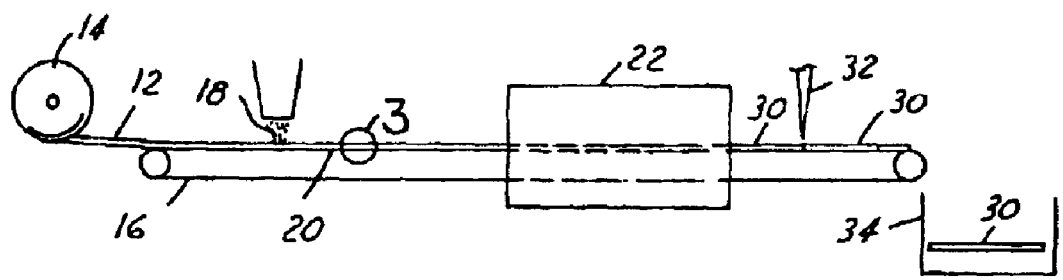
FIG. 1 illustrates a preferred process for making a fiberglass preform according to the present invention.
Figure 2:
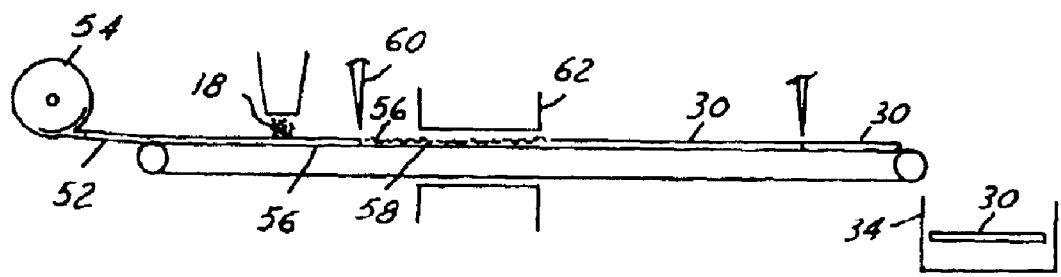
FIG. 2 illustrates another preferred process for making a fiberglass preform according to the present invention.

FIGS. 1 and 2 illustrate two preferred methods for making a fiberglass preform 30 according to the present invention.

As shown in FIG. 1, a matting structure 12 is unrolled from a creel 14 or similar device onto a conveyor belt 16. A b-stageable thermoset polymer powder binder 18 is impregnated within the matting structure 12 to form an impregnated matting structure 20. This can be accomplished using an electrostatic sprayer or by forced air spraying, techniques that are well known in the art. The impregnated matting structure 20 is then introduced to an oven 22, wherein the powder binder 18 is tackified and adheres to the fiber strands (shown as 52 in FIG. 2) to the matting structure 12 to form the preform 30. The preform 30 is then chopped to an appropriate size using a chopper 32 or similar sizing device well known in the art. The preform 30 may then be stored in a container 34 for subsequent processing.

One preferred matting structure 12 that may be used is a glass-roving based matting such as M8610, commercially available from Owens Corning.

The preform 30 preferably has a weight between approximately 100 and 2000 grams per meter squared. The preform 30 preferably has a powder binder 18 content of between 10 and 90 percent of the total weight of the preform 30.

Alternatively, as shown in FIG. 2, the preform 30 may be made by first unrolling a continuous strand 52 of fibrous material from a creel 54. A b-stageable thermosetting polymer binder 18 is aspirated onto the strand 52 by conventional means, therein forming a coated strand 56. As above, this can be accomplished using an electrostatic sprayer or by forced air spraying. The coated strand 56 is chopped onto a belt 58 using a chopper 60 or similar device well known in the art. The coated strand 56 then proceeds through a lamination belt 62 to tack the powder binder 18 to the strand 52 to form a preform 30. The preform 30 is then chopped to an appropriate size using a chopper 32 or similar sizing device well known in the art. The preform 30 may then be stored in a container 34 for subsequent processing.

Again, similar to FIG. 1, the preform 30 preferably has a weight between approximately 100 and 2000 grams per meter squared. The preform 30 preferably has a powder binder 18 content of between 10 and 90 percent of the total weight of the preform 30.

Figure 3:
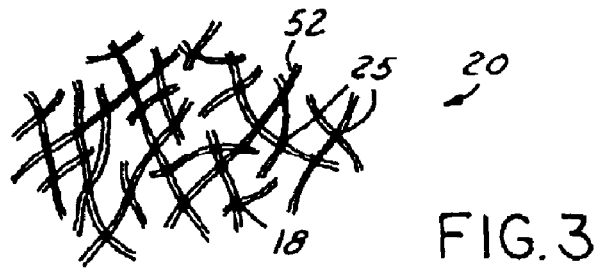
FIG. 3 is close-up view of the coated glass fiber strands of FIGS. 1 and 2.

An important feature of the present invention, as shown in FIG. 3, is that the powder binder 18, when softened (tackified) using an oven 22 in FIG. 1, or a lamination belt 62 as in FIG. 2, is effective at migrating along the length of the fiber strands 52 to the crossover points, or junctions 25, between fibers strands 52. This forms a preform 30 with good shape retention characteristics. This also allows the subsequently applied liquid thermosetting matrix binder resin 106, shown below in FIG. 4, to more easily impregnate the interstices between the strands 52 and spread along the length of the strands 52 during the SRIM molding process, therein forming a composite part 100 that is more homogeneous, and hence stronger.

The continuous strand 52 of fibrous material is preferably in the form of a continuous strand composed of multiple filaments. The strands may take the form of yarns, or rovings, including two-end and four-end rovings. Typically, such reinforcing strands are formed by combining filaments of the reinforcing fiber material as they are attenuated from a fiber-forming apparatus such as a bushing or orifice plate, although they may also be made by any method conventionally known in the art. The filaments may be coated with a sizing composition comprising functional agents such as lubricants, coupling agents and film-forming polymers, after which they are gathered into strands. These strands may then be formed into yarns or rovings.

One preferred continuous strand 52 is a glass-roving product such as K75 S—O forming cake fibrous glass (7500 yds./lb.). Another preferred strand is a yarn product such as G-75 glass yarn (7500 yds./lb.). Another preferred strand is 956BC113 (7500 yds./lb.). Each of these products are commercially available from Owens Corning.

The powder binder 18 is a b-stageable thermosetting powder resin that, for the purposes of this invention, has a stable shelf life in powder form which can be heated to a tackifying temperature without crosslinking such that it will stick to and adhere together the glass fiber strands 52 to form the preform 30. The b-stageable thermosetting polymer may then be subsequently heated at a higher temperature such that the polymer may crosslink with itself to form a crosslinked polymer material. Further, as the binder 30 is stable at room temperature, the preform 30 can be shipped prior to injection molding without worry of the powder binder crosslinking. This allows the preform 30 to be shaped easily in subsequent processing. The presence of the b-stageable powder binder 18 in the preform 30 also controls the porosity, tortuosity and permeability of the preform 30 and enables easier migration of the thermosetting resin to create a uniform bulk density.

The preferred powder binder 18 is a commercially available b-stageable powder resin commonly used in the powder paint industry. This is important because the net effect of such a use is to substantially reduce costs in the finished composite parts (shown as 100 in FIG. 4). Any number of chemistries may be used, including thermosetting polyester resin systems (hydroxy terminated, carboxy terminated, and epoxy crosslinked), epoxy resin systems based on bisphenol A, urethane resin systems, acrylic resin systems, methacrylic resin systems, and various copolymer systems that meet the requirements of a b-stageable thermosetting resin as defined above. Some commercially available examples are listed below in Table 1:

TABLE 1

| NAME | DESCRIPTION | MANUFACTURER |
|---|---|---|
| PL112U | Thermosetting polyester/urethane blend | Courtaulds |
| 680-12003 | Thermosetting acrylic powder | E. I. DuPont De Nemours, Inc. |
| 158E114 | Thermosetting powder (organic with dodecanoic acid) | Ferro Chemical |
| MX-1000-SA | Recycled powder coating | Surplus Coatings |
| LL2238 | Copolymers of methacrylic acid esters and styrene | Vinnex |
| LL2370 | Copolymers of methacrylic acid esters and styrene | Vinnex |

Figure 4:
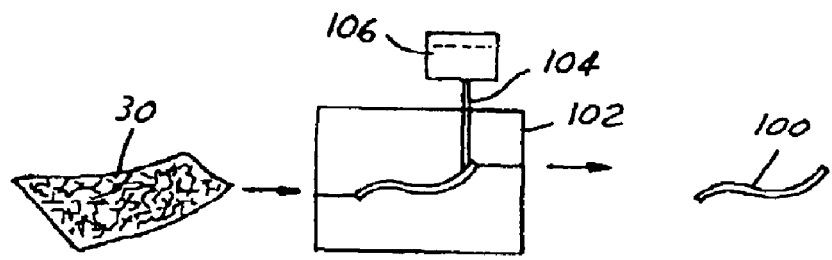
FIG. 4 illustrates the preferred process for making a composite part from the preform of FIGS. 1 and 2.

As shown in FIG. 4, the preform 30 may be further processed to form a composite part 100 by introducing the preform to an SRIM molding machine such as a shaped thermoforming tool 102. A port 104 or similar opening allows introduction of a liquid thermosetting matrix binder resin 106 within the tool 102. The tool 102 is then closed at a predetermined pressure and temperature sufficient to cure the binder resin 106 to the preform 30 to form the composite part 100. As described above, the matrix binder resin 106 penetrates within the interstices of the fiber strands 52 and crosslinks primarily to itself at the molding temperature and pressure. The matrix binder resin 106 does substantially interact and crosslink with the powder binder 18, however, the powdered binder 18 may crosslink to itself at these elevated temperatures. The crosslinking of the binder resin 106 and powdered binder 18 within the tool 102 therein forms the composite part 100. The performance characteristics that are required for the formed composite part 100 are listed below in Table 2.

The matrix polymer resin 106 that may be used is preferably a polyurethane foaming composition based on polyol/polyisocyanate chemistry that reacts to form a crosslinked network at molding temperatures. The ratio of mixtures of polyols and isocyanates, as well as the types of terminal end groups contained on the isocyanates, may vary as one of ordinary skill would appreciate depending upon the ultimate end use application and physical requirements. Three types of foaming polyurethane compositions are preferred, including rigid, flexible and semi-rigid thermoformable foams that form a network having a density of about 1–100 kilograms per cubic meter.

One preferred polyol class comprises polyether polyols such as propylene oxide-ethylene oxide available from Bayer Chemical. Other preferred polyols include hydroxy-functional phenols and polyester polyols having a number average molecular weight between about 500–10,000 grams per mole and a ring ester to dicarboxylic acid content of about 1:1.

Preferred polyisocyanates are organic diisocyanates that are compatible with the above mentioned preferred polyol class and react with the polyols to form a polyurethane foam composition. Other ingredients that are typically found in the foaming composition are catalysts, water, additives, and foaming agents that are well known to those of skill in the art.

The composite parts 100 formed using the preferred polyol-polyisocyanates listed above have a fiber composition and density sufficient to control the Coefficient of Thermal Expansion of the composite part 100 to between approximately $1.0 \times 10^{-5}$ and $1.0 \times 10^{-7}$ and having the following performance characteristics listed below in Table 2:

TABLE 2

| PERFORMANCE CHARACTERISTIC | ASTM STANDARD | RANGE |
|---|---|---|
| Tensile strength | D638 | 600 psi–3500 psi |
| Flexural modulus | D790-A, 1% secant | 50,000 psi–250,000 psi |
| Impact resistance | D3029, method G | ≧4 Joules |
| Cold temperature impact | 127 diameter ball weighing 4.5 Kg dropped from a height of 610 mm at −30 C. | |
| Heat degradation | D573 | 500 hrs at 110 C. |

The composite parts 100 that are formed in the present invention can be used in a wide variety of applications. It is specifically contemplated that the composite parts 100 could be used for interior automotive applications. For example, it is contemplated that the composite parts 100 formed could be used for such applications as interior door trim, parcel shelves, headliners, or floor components.

The preform 30 and formed composite parts 100 of the present invention offer significant cost savings over the prior art by utilizing presently available b-stageable thermosetting powders. Further, by controlling the location of the powder binder along the strands 52 during the application step (i.e. to the junctions 25), a preform 30 having good retention characteristics is formed. The presence of the b-stageable powder binder 18 in the preform 30 also controls the porosity, tortuosity and permeability of the preform 30 and enables easier migration of the thermosetting resin to create a uniform bulk density. This also allows the subsequently applied liquid thermosetting matrix binder resin 106 to more easily impregnate the interstices between the strands 52 and spread along the length of the strands 52 during the SRIM molding process, therein forming a composite part 100 that is more homogeneous, and hence stronger.

While the invention has been described in terms of preferred embodiments, it will be understood, of course, that the invention is not limited thereto since modifications may be made by those skilled in the art, particularly in light of the foregoing teachings.

What is claimed is:

1. A method for forming a fiber reinforced composite part comprising:

forming a fiber preform comprising a plurality of glass fiber strands and a b-stageable thermosetting powder binder;

introducing said fiber preform to a mold;

introducing a liquid thermosetting matrix binder to said mold;

closing said mold at a sufficient temperature and pressure to thermoset said liquid thermosetting matrix binder to itself and to thermoset said b-stageable thermosetting powder to itself.

2. The method of claim 1, wherein forming a glass fiber preform comprises:

providing a glass fiber matting having a plurality of glass fiber strands;

introducing a b-stageable thermosetting powder binder to said glass fiber matting; and heating said b-stageable thermosetting powder binder and said glass fiber matting to a first temperature and a first period of time to adhere said b-stageable resin to said glass fiber matting, said first temperature and first period of time being sufficient to tackify said b-stageable thermosetting powder resin without substantially crosslinking said b-stageable thermosetting powder binder.

3. The method of claim 2, wherein heating said b-stageable thermosetting powder binder and said glass fiber matting comprises heating said b-stageable thermosetting powder binder and said glass fiber matting to a first temperature and a first period of time to migrate and adhere said b-stageable resin to a junction formed between at least two of said plurality of glass fiber strands within said glass fiber matting.

4. The method of claim 1, wherein forming a glass fiber preform comprises:

providing a continuous length of a glass fiber strand;

introducing a b-stageable thermosetting powder binder to said glass fiber strand to form a coated strand;

chopping said coated strand onto a belt to form a plurality of chopped coated strands; and introducing said plurality of chopped coated strand to a lamination belt to tackify and adhere said b-stageable thermosetting powder binder to said glass fiber strand without substantially crosslinking said b-stageable thermosetting powder binder to said glass fiber strand.

5. The method of claim 4, wherein introducing said chopped coated strand comprises introducing said chopped coated strand to a lamination belt to tackify, migrate and adhere without substantially crosslinking said b-stageable thermosetting powder binder to a junction formed between at least two of said plurality of glass fiber strands.

6. The method of claim 1, wherein introducing a liquid thermosetting matrix binder to said mold comprises introducing a thermosetting polyurethane foaming composition to said mold, said thermosetting polyurethane foaming composition comprising the reaction product of a polyol and an organic polyisocyanate.

7. The method of claim 6, wherein said polyol is selected from the group consisting of a polyether polyols, a hydroxy functional phenol and a polyester polyol, said polyester polyol having a number average molecular weight of weight between about 500–10,000 grams per mole and a ring ester to dicarboxylic acid content of about 1:1.

8. The method of claim 1, wherein said b-stageable thermosetting powder binder resin is selected from the group consisting of a b-stageable thermosetting polyester resin systems, a b-stageable thermosetting bisphenol A type epoxy resin system, a b-stageable thermosetting urethane resin system, an b-stageable thermosetting acrylic resin systems, a b-stageable thermosetting methacrylic resin systems, copolymer systems thereof, and mixtures thereof.

* * * * *